United States Patent [19]

Schmidhauser

[11] 4,280,037
[45] Jul. 21, 1981

[54] APPARATUS FOR CASHLESS PAYMENT OF MERCHANDISE OR SERVICES

[75] Inventor: Rolf Schmidhauser, Cham, Switzerland

[73] Assignee: LGZ Landis & Gyr Zug AG, Switzerland

[21] Appl. No.: 112,903

[22] Filed: Jan. 17, 1980

[30] Foreign Application Priority Data

Jan. 31, 1979 [CH] Switzerland ............................ 928/79

[51] Int. Cl.³ ........................ G06K 7/10; G06K 13/00; G06K 19/06
[52] U.S. Cl. .................................... 235/454; 235/477; 235/494
[58] Field of Search ............... 235/380, 454, 457, 466, 235/469, 494, 477, 476; 250/555, 569

[56] References Cited

U.S. PATENT DOCUMENTS

| | | | |
|---|---|---|---|
| 3,671,722 | 6/1972 | Christie | 235/465 |
| 3,761,700 | 9/1973 | Patel et al. | 235/465 |
| 4,108,367 | 8/1978 | Hannan | 235/457 |
| 4,143,810 | 3/1979 | Greenaway | 235/457 |

FOREIGN PATENT DOCUMENTS

2451939 5/1975 Fed. Rep. of Germany .
2731727 1/1979 Fed. Rep. of Germany .
1502460 3/1978 United Kingdom .

Primary Examiner—Daryl W. Cook
Attorney, Agent, or Firm—Ernest F. Marmorek

[57] ABSTRACT

The invention relates to a combination of an apparatus for the transfer of fungible goods or services, for example, cashless payment for merchandise or services, with a transfer device having marked thereon a plurality of cancellable value units in the form of at least first and second types of optical markings different from one another, and arranged in a predetermined cyclical sequence on at least one track of the transfer device, without the occurrence of any gaps, but with a transition region formed between adjacent markings. The apparatus includes a reading device, inclusive of a light source, and at least first and second light sensors associated with the first and second types of optical markings, respectively. The reading device is arranged for reading and generating signals from the markings, and from the transition regions, and an activatable erasing device erases the markings in dependence of the number of value units to be cancelled. A transport device effects a relative movement between the transfer device, and respectively, the reading and erasing devices along the track, and a control device controls the movement of the transport and erasing devices, disables the transport device, and activates the erasing device, when the erasing device is near one of the transition regions.

6 Claims, 8 Drawing Figures

$V_A$ $V_B$ $V_A + V_B$ $V_A - V_B$

APPARATUS FOR CASHLESS PAYMENT OF MERCHANDISE OR SERVICES

CROSS-REFERENCE TO RELATED APPLICATIONS

Reference should be made to the application entitled: "Method and Apparatus for the Identification of Documents" filed by the Application of the present invention, and assigned to the Assignee of the present invention.

BACKGROUND OF THE INVENTION

From Swiss Pat. No. 574,144 and the corresponding British Pat. No. 1,502,460, there has become known an apparatus for the cashless payment for goods or services, which employs payment means on which there are arranged markings, on several parallel tracks at a predetermined spacing from one another, which markings may be similar or different from one another. A transport mechanism not further described in detail moves the payment means past a reading head, and an erasing head. The transport means is stopped as soon as a valid marking is sensed below the reading head, and the payment or credit means is devalued by a unit in which the corresponding marking is erased. The arrangement of the markings spaced at a distance from one another has the disadvantage, that as a result of the vacant spaces between the individual markings, a portion of the available storage surface remains unused, so that the storage capacity of the payment means is inefficiently utilized.

From U.S. Pat. No. 4,108,367 there has become known payment means, in which each value unit is defined by two holograms. The hologram pairs are spaced at a distance from one another.

From German Patent DE - OS No. 27 31 727, corresponding to U.S. Patent Application Ser. No. 913,222 of the Assignee of the instant application, there has become known a card using an information track and a timing track. The timing track is formed by three types of markings, which follow one another without the occurrence of any gap.

Although it is therefore possible for the markings to follow one another without the occurrence of any gap, and to use an edge, or a separate starting mark of the payment means as a local reference to locate the erasing position, this would require a mechanically expensive transport device, which would be required to operate without any play, and to advance in steps of predefined lengths to avoid any malpositioning, and therefore any erroneous devaluations or cancellations. If the payments means shrinks as a result of heat or the like applied thereto, it is still possible that malpositioning of the payment means may occur.

It is finally conceivable to provide a separate timing track, with the aid of which erasing positions can be located, and where the timing signal serves as a local reference. This does, however, require additional space on the payment means, increases the cost of manufacture of the payment means, and also requires an additional reading head inclusive of the associated electronic detection circuitry, for interrogating or scanning the markings on the payment means serving as a timing reference.

SUMMARY OF THE INVENTION

One of the principal objects of the invention is therefore to utilize the storage space available as efficiently as possible, to dispense with a separate timing track, and to ensure that the erasing positions are located in an errorless manner, without placing any great demands on the transportation means.

Further objects and advantages of the invention will be set forth in part in the following Specification, and in part will be obvious therefrom without being specifically referred to, the same being realized and attained as pointed out in the claims hereof.

BRIEF DESCRIPTION OF THE DRAWINGS

For a fuller understanding of the nature and object of the invention, reference should be had to the following detailed description, taken in connection with the accompanying drawings, in which.

DESCRIPTION OF THE PREFERRED EMBODIMENTS

In carrying the invention into effect, there will be seen a payment means 1 in the form of a card, on which a plurality of value units are arranged in the form of optical markings 3. Each marking 3 modifies light impinging thereon in a characteristic manner by diffraction, or refraction, of the reflected or transmitted rays; thus it is possible, for example, to use holograms, diffraction gratings of kinoforms, which bear on the authenticity of the payment means or card, and are difficult to counterfeit or forge. In the example illustrated, there are provided n=2 types A and B of different markings 3, which are arranged on the track 2 in a predetermined cyclical sequence, so as to preclude the occurrence of any gap between adjacent markings 3.

When making use of the payment means 1 in an apparatus for cashless payment for merchandise or services, it is introduced into a reading and cancelling device, in which the markings 3 are passed on with respect to their authenticity, and are cancelled step-by-step in dependence of a monetary amount to be paid.

Figure 1:
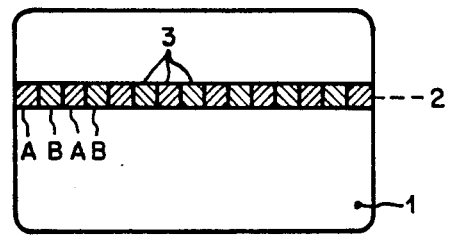
FIG. 1 is a plan view of a payment means, according to the invention.
Figure 2:
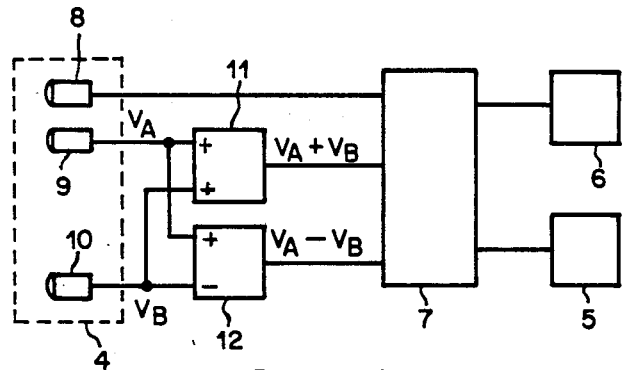
FIG. 2 is a block schematic diagram of the apparatus, according to the invention.

The reading-and cancelling-unit then includes, according to FIG. 2, substantially a reading head 4, and an erasing head 5, a transport device 6 for generating a relative motion between the payment means 1 and, respectively, the reading head 4, as well as the erasing device 5, and a control means 7 for controlling the transport device 6, for evaluating signals obtained from the reading head 4, and for controlling the erasing head 5.

The erasing head 4 includes a light source 8, which illuminates a region of the track 2 disposed below the reading head 4 by means of a light ray. The reading head 4 includes as many light sensors as there are different types of optical markings, namely in the illustrated example two, as there are two light sensors 9 and 10 associated with the markings A and B, respectively. The light sensor 9 generates an electrical signal $V_A$, and the light sensor 10 generates an electrical signal $V_B$. Both light sensors 9 and 10 are connected to a summer 11, and a substractor 12, which form a sum signal $V_A+V_B$, and a difference signal $V_A-V_B$, respectively. If the number of different types of optical markings, and hence of the light sensors, exceeds $n=2$, then a plurality of substractors are required; two light sensors associated with two successive markings 3, respectively, are connected to a substractor, and all n light sensors are connected to a summer 11.

Figure 3A:
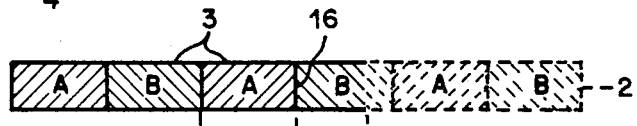
FIG. 3a is a typical track with some markings erased.

An enlarged version of the track 2 with the markings 3, A and B, is shown in FIG. 3a. The markings 3, A and B, shown dotted in FIG. 3a, and disposed on the right hand side of the Figure, have already been erased.

Figure 3B:
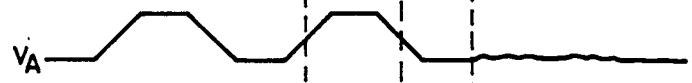
FIG. 3b is an output signal obtained from a first light sensor.
Figure 3C:
FIG. 3c is an output signal obtained from a second light sensor.
Figure 3D:
FIG. 3d is a signal summing the outputs of the first and second light sensors.
Figure 3E:
FIG. 3e is a different signal obtained from subtracting the output of one light sensor from another.
Figure 3F:
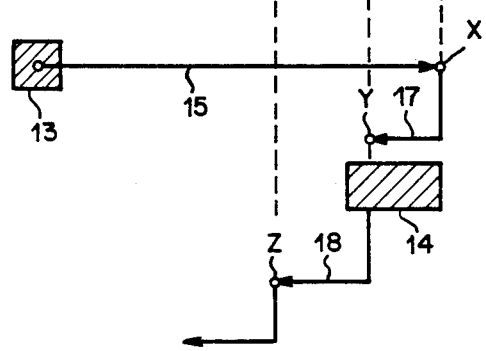
FIG. 3f is a schematic diagram, illustrating the motion of the transport means of the present invention.

FIG. 3b shows the signal $V_A$, FIG. 3c the signal $V_B$, FIG. 3d the sum signal $V_A+V_B$, and FIG. 3a the difference signal $V_A-V_B$. The motion of the transport device 6 is schematically illustrated in FIG. 3f, where the optically effective area of the reading head 4 in its initial position is denoted by the reference numeral 13, and the effective surface of the erasing head 5, which is disposed in an erasing position, is denoted by the reference numeral 14.

Following introduction of the payment means 1 into the reading and cancelling apparatus, the control device 7 activates the transport device 6. The reading head 4 starts to move in the direction of the arrow 15, namely in FIG. 3f from left to right along the track 2. Impulse signals $V_A$ and $V_B$ are generated by the light sensors 9 and 10, respectively, which have relatively shallow leading and trailing edges, in view of the finite width of the surface 13. The sum signal $V_A+V_B$ is approximately constant, and is reduced to zero, if the reading head 4 leaves the non-erased markings 3, and passes over the erased markings. Each null-point transition of the difference signal $V_A-V_B$ marks a transition region 16 between two adjacent markings 3. By counting these null-point transitions in a counter of the control device 7, the number of non-erased transition zones, and consequently of still valid units, is counted.

As soon as the sum signal $V_A+V_B$ falls below a predetermined threshold at a point X, the control device 7 reverses the direction of movement of the transport device 6. The reading head 4 therefore moves in the direction of the arrow 17, namely in a direction opposite to the direction shown by the arrow 15 towards the point Y, which coincides with the first non-erased transition region 16, and hence with the first passage through a null point of the difference signal $V_A-V_B$. Upon the reading head 4 reaching the point Y, the control device 7 disconnects the transport device 6, and activates the erasing head 5. The erasing head at this point is disposed near a location defined by the first non-erased transition region 16, and is so adjusted, that that transition region is now erased. Erasure can be accomplished by thermal action, or by any other known action. After the erasure has been accomplished, the transport device 6 is again switched in, and the reading head 4 moves in the direction of the arrow 18 to the point Z, or to its initial position, depending on whether the payment means 1 requires cancellation of another value unit or not.

The advantages of the invention will now be relatively easily seen. As the markings 3 border one another within the track 2 without any gap being formed therebetween, the storage surface at their disposal can be fully utilized. Although a separate timing track is not required, the erasing head 5 is positioned in dependence of timing information obtained from the transition regions 16 of the different types of markings A and B, following one another in a predetermined cyclical sequence, on the track 2. This permits an error-free location of the erasing position, even if the payment means 1 is subjected to any changes of length, for example by being subjected to heat. The high positioning accuracy permits one to choose the dimensions of the markings 3 to be smaller in relation to known implementations, so that a commensurately higher storage density is obtained. The length of each step of the transport device 6 is determined by the length of the markings 3, so that the transport arrangement can be constructed using very simple means.

As the erasing head 5 not only any last non-erased marking 3, but also any transition region 16, bordering thereonto, any slight positioning errors cannot even cause any partial erasure of a value unit. It is advantageous in this respect, if the erasing head 5 is asymetrically positionable with the respect to the transition regions 16, so that more than one-half of the markings bordering any erased transition region 16 remain non-erased, and are reliably scanned, when the reading head 4 interrogates the next transition region 16.

It will be understood that the detection of the transition regions 16 based on the difference signal $V_A-V_B$ is particularly advantageous, but can also be accomplished by any other means. The scanning or interrogation of the transition regions 16 during the forward motion of the reading head 4, and their cancellation during the return motion of the erasing head 5, makes it possible to determine the remaining value of the payment means 1 in a very simple manner, before any further cancellation of value units disposed thereon takes place. It is also possible to arrange additional tracks parallel to the track 2, which have optical markings. These markings of additional tracks may be of the same type, for example of the type A, where the positioning of the erasing position can be accomplished based on the timing signals obtained from the transition region 16 of track 2. The erasing head 5 may serve to erase the markings of any additional tracks, and then can be implemented as a multiple-head erasure device, or as an erasing head which may be displaced in a direction transverse to, or vertically to the direction of the tracks.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. The combination of an apparatus for the transfer of fungible goods or services, for example, cashless payment for merchandise or services with
    transfer means having marked thereon a plurality of cancellable value units in the form of at least first and second types of optical markings different from one another, said markings being arranged in a predetermined cyclical sequence on at least one track of said transfer means, so as to preclude the occurrence of any gap between adjacent markings, each individual marking modifying light impinging thereon in a characteristic manner, a transition region being formed between said adjacent markings, said apparatus comprising:

reading means, including a light source, and at least first and second light sensors associated with said first and second types of optical markings, respectively, said reading means being arranged for reading and generating signals from said markings, and from said transition regions, activatable erasing means for erasing said markings in dependence of the number of value units to be cancelled, transport means for effecting a relative movement between said transfer means, and respectively, said reading means and said erasing means, along said track, said reading means and said erasing means being movable near to said transition regions, and control means for controlling the movement of said transport means, and of said erasing means, for evaluating the signals from said reading means, and for disabling said transport means and activating said erasing means upon said erasing means being near one of said transition regions, so as to erase said one transition region.

2. An apparatus for the transfer of fungible goods or services, for example, cashless payment for merchandise or services adapted to receive transfer means having marked thereon a plurality of cancellable value units in the form of at least first and second types of optical markings different from one another, said markings being arranged in a predetermined cyclical sequence on at least one track of said transfer means, so as to preclude the occurrence of any gap between adjacent markings, each individual marking modifying light impinging thereon in a characteristic manner, a transition region being formed between said adjacent markings, comprising in combination:

reading means, including a light source, and at least first and second light sensors adapted to be associated with said first and second types of optical markings, respectively, said reading means being adapted for reading, and generating signals from said markings and from said transition regions, activatable erasing means adapted to erase said markings on said transfer means in dependence of the number of value units to be cancelled, holding means for receiving said transfer means, transport means for effecting a relative movement between said holding means, and respectively said reading means and said erasing means, along said track, said reading and erasing means being movable near to said transition regions, upon said transfer means being received in said holding means, and control means for controlling the movement of said transport means, and of said erasing means, for evaluating the signals from said reading means, and for disabling said transport means and activating said erasing means upon said erasing means being near one of said transition regions, so as to erase said one transition region.

3. An apparatus as claimed in claim 1 or 2, wherein the erasure of adjacent portions of two markings, respectively, also erases the transition region between said two markings, and wherein said reading means and said erasing means are couplable to said transport means, and wherein said transport means is controllable by said control means to be movable in a predetermined direction, and in a direction opposite thereto, and wherein said reading means is adapted to read any non-erased transition regions upon being moved in said predetermined direction, and said erasing means is adapted to erase at least selected of said transition regions upon being moved in said direction opposite to said predetermined direction.

4. An apparatus as claimed in claim 3, and further comprising a counter said non-erased transition regions.

5. An apparatus as claimed in claims 1 or 2, wherein said first and second types of markings alternate with one another, and further comprising adding means and subtracting means connected to said light sensors for providing first and second output signals, respectively, during movement of said transport means, for said control means to reverse the movement of said transport means upon said first output signal failing to reach a predetermined threshold, and for disconnecting said transport means, and activating said erasing means, upon said second output signal passing through a null region.

6. An apparatus as claimed in claims 1 or 2, wherein said transfer means include payment means, each cancelled unit thereby denoting payment of a monetary amount corresponding thereto.

* * * * *